Feb. 6, 1951

W. J. GRUEN 2,540,820

OSCILLATOR SYNCHRONIZING SYSTEM

Filed Sept. 16, 1949

Inventor:
Wolf J. Gruen,
by Merton D. Moore
His Attorney.

Patented Feb. 6, 1951 2,540,820

UNITED STATES PATENT OFFICE 2,540,820

OSCILLATOR SYNCHRONIZING SYSTEM

Wolf J. Gruen, Syracuse, N. Y., assignor to General Electric Company, a corporation of New York Application September 16, 1949, Serial No. 116,165

7 Claims. (Cl. 250—36)

Figure 1:
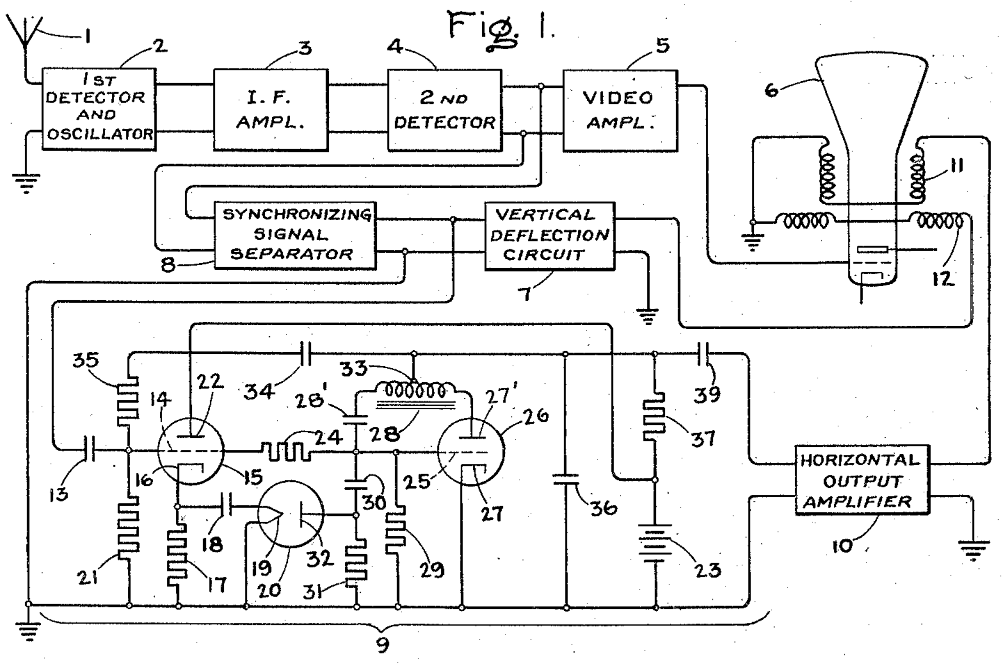

My invention relates to synchronizing systems and more particularly, to oscillator systems which employ a periodic synchronizing signal consisting of synchronizing pulses which may be contaminated by spurious and undesired signals. While my invention is of general utility, it is particularly useful in the field of television wherein it is desirable to provide noise-free synchronization of the scanning oscillators, especially the line frequency scanning oscillator of the television receiver.

For some purposes, it is necessary to synchronize an oscillator from a periodically recurring pulse of small energy content relative to a sine wave of the same amplitude and frequency. This requirement for example, is found in television systems wherein the composite synchronizing signal is transmitted as a series of pulses which occur during the line and field retrace intervals, these pulses being separated from the picture signal in the television receiver and utilized to synchronize the scanning oscillators at the receiver with the scanning oscillators of the transmitter. Certain synchronizing systems heretofore proposed for synchronizing the scanning oscillator at the receiver. have applied the synchronizing signals directly to the scanning oscillators. Such systems provide relatively little discrimination against spurious pulses which may be interspersed with the synchronizing pulses and hence such systems are subject to periods of asynchronous operation.

Various arrangements have been proposed to obtain an automatic frequency control or "AFC" type of synchronization in which the synchronizing pulses are utilized to derive a unidirectional control wave which is applied to the scanning oscillator. In these arrangements, the synchronizing pulses are combined with an output wave from the scanning oscillator the wave shape of the resultant electrical wave being a function of the relative phase relation of the synchronizing pulses and the output wave from the scanning oscillator. The resultant wave is integrated over a relatively large number of cycles so that the effects of random noise impulses are averaged out and only gradual changes in the phase relationship of the two waves appear in the output of the integration circuit.

In an application, Serial Number 67,142 to R. B. Dome which was filed on December 24, 1948 for "Synchronizing Circuit," and which is assigned to the same assignee as the present invention, there is disclosed an oscillator synchronizing system in which synchronization is effected by means of thermal integration of the alternating current components of a phase responsive waveform which is derived from a combination of the periodic synchronizing signal and an output wave from the oscillator. Electrical energy proportional to the derived wave is stored in the form of heat energy in a body having a substantial heat time constant and the stored heat energy is utilized to control the frequency of the oscillation generator. In such an arrangement it is desirable that the mass in which the control heat energy is stored be as small as possible so as to provide a thermal time constant which is sufficiently small to follow changes in the average frequency of the synchronizing signals. It is also desirable to accomplish the storage of heat and conversion of the same to a form which may be used to control the frequency of the scanning oscillator, in a simplified circuit arrangement wherein a minimum number of circuit components are required.

It is, accordingly, an object of my invention to provide an improved system for storing control heat energy in a thermal integration oscillator synchronizing system.

It is a further object of my invention to provide an improved means for storing control heat energy in a thermal integration oscillating synchronizing system wherein the oscillator may be synchronized over a relatively large range of frequencies.

It is a still further object of my invention to provide an improved oscillator synchronizing system of the thermal integration type wherein an electron discharge device operates both as a heat storage element and as a frequency controlling element of the oscillator.

It is another object of my invention to provide a new and improved means for synchronizing an oscillator from a synchronizing signal which may be contaminated by spurious and undesired impulses, in which the anode-cathode space path resistance of an electron discharge device is varied by means of stored control heat energy so as to control the frequency of the oscillator in accordance with the phase relationship of the synchronizing signals and the oscillator.

Briefly, in accordance with my invention, a phase responsive waveform is derived by combining the synchronizing pulses with an output wave of the oscillator. The derived wave form the energy content of which is proportional to the phase relationship of the two waves, is supplied to a directly heated cathode of a diode type electron discharge device. Variations in the phase relation of the oscillator and the synchronizing pulse cause corresponding variations in the anode-cathode space path resistance of the diode which variations in resistance are utilized to control the frequency of the oscillator in any convenient manner. In a particular embodiment, a second diode type electron discharge device of the indirectly heated cathode type is connected in series with a resistor across the directly heated diode. By such an arrangement the effective resistance of the network can be made to vary over a substantially increased range of values whereby the oscillator synchronizing range is substantially increased.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings wherein Fig. 1 is a schematic diagram, partly in block diagram form, of a modulated carrier wave television receiver embodying the principles of my invention; and Fig. 2 is a schematic diagram of a portion of the circuit of Fig. 1 embodying the features of my invention in an alternative form.

Figure 2:
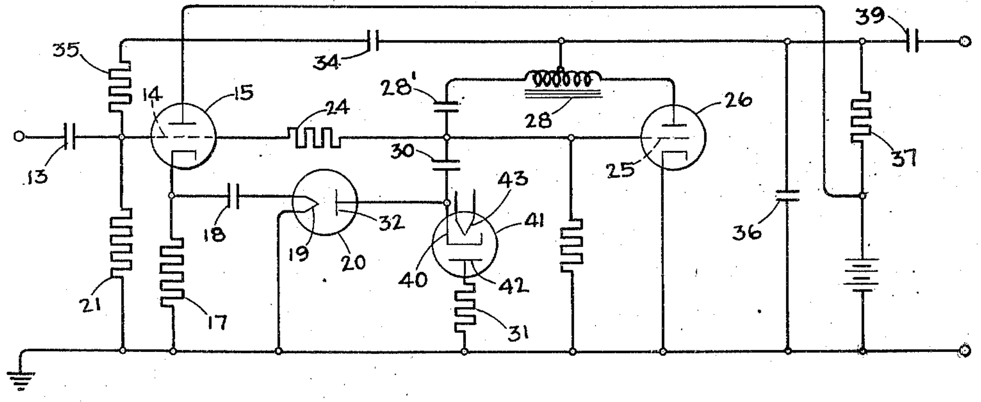

Referring now more particularly to the drawing, the system illustrated in Fig. 1 comprises a modulated carrier wave television receiver of the superheterodyne type including an antenna system 1 which is connected to a first detector and oscillator 2, to which are connected in cascade relation in the order named, an intermediate frequency amplifier 3, a second detector 4, a video amplifier 5 and a cathode ray tube viewing device 6. A vertical deflection circuit 7 is connected to the output of the second detector 4 through synchronizing signal separator 8. The output of the synchronizing signal separator 8 is also connected to a synchronized scanning oscillator circuit 9, to be fully described hereinafter, the output of the scanning oscillator 9 being coupled to a horizontal output amplifier 10. The output of the scanning amplifier 10 and vertical deflection circuit 7 are connected to their respective scanning coils 11, 12 which surround the neck of the cathode ray tube 6.

The units 1 through 8 and 10 inclusive may be of conventional well known design so that a detailed illustration thereof is unnecessary herein. However, referring briefly to the operation of the above-described system as a whole, television signals intercepted by antenna circuit 1 are applied to oscillator-detector 2 wherein they are converted into intermediate frequency signals which are amplified in the amplifier 3 and delivered to the second detector 4. The modulation components of the video signal are detected in detector 4 and applied to video amplifier 5 wherein they are amplified and supplied in the usual manner to the control electrode of the cathode ray tube 6. The detected modulation components are also supplied to synchronizing signal separator 8 wherein the vertical and horizontal synchronizing signals are separated, the vertical synchronizing signals being supplied to the vertical deflection circuit 7. Synchronized scanning waves which are generated in the horizontal oscillator circuit 9 are amplified in horizontal amplifier 10 and applied to the scanning coils 11 of the cathode ray device. Likewise scanning waves from the vertical deflection circuit 7 are applied to the vertical scanning coils 12 so as to produce magnetic scanning fields which deflect the electron beam of the cathode ray tube in two directions perpendicular to each other so as to trace a rectilinear pattern on the screen and thereby to reconstruct the transmitted image.

Referring now more particularly to the portion of Fig. 1 embodying the present invention, synchronizing pulses of positive polarity, which have been separated from the composite signal in synchronizing separator 8, are coupled through a capacitor 13 to the control electrode 14 of an electron discharge device 15. The cathode 16 of device 15 is connected to ground potential through a resistor 17. The cathode 16 is also connected to ground through a series combination of a capacitor 18 and the cathode 19 of an electron discharge device 20. Device 20 is preferably of the directly heated cathode type. Also connected to the control electrode 14 is a leak resistor 21 the other end of which is connected to ground. The anode 22 of device 15 is connected to the positive terminal of a unidirectional source of potential which is indicated by the battery 23.

The control electrode 14 of device 15 is also connected through a resistor 24 to the control electrode 25 of a second electron discharge device 26. The cathode 27 of device 26 is connected to ground. The anode 27′ of device 26 is connected through an iron-cored transformer 28 and a capacitor 28′ back to the control electrode 25. The control electrode 25 is connected to ground through a leak resistor 29 and is also connected to ground through a series combination of a capacitor 30 and resistor 31 which is connected in parallel across leak resistor 29. The anode 32 of control device 20 is connected to the junction point of capacitor 30 and resistor 31. An output wave from device 26 is connected from the tap 33 on transformer 28 through a capacitor 34 and resistor 35 back to the control elctrode 14 of device 15. Also connected to tap 33 is a capacitor 36, the other end of which is connected to ground. Anode potential for device 26 is supplied from the positive terminal of battery 23 through a resistor 37 and a portion of the transformer 28. Scanning waves which are generated in device 26 are coupled to horizontal output amplifier 10 by means of a coupling capacitor 39 which is connected to the junction point of capacitor 36 and resistor 37.

Considering now the operation of the oscillator synchronizing system described above, the oscillation generator 26 is illustrated as a blocking oscillator of well known design. Briefly, considering the operation of the blocking oscillator, the anode of device 26 and the control electrode 25 thereof are coupled together by means of iron core feed-back transformer 28 so as to produce oscillations therein, there being provided a control electrode biasing network comprising resistors 29 and 31 and capacitors 28′ and 30. While transformer 28 is illustrated as an auto-transformer, it will be understood that any suitable transformer arrangement may be utilized to couple energy from the anode to the control electrode in the proper place to sustain oscillations. The time constant of the biasing network is sufficiently large so that oscillations cease after a single cycle thereof and do not start again until a lapse of an appreciable time interval, this interval being required for the charge acquired by capacitors 28′ and 30 to leak off through the respective resistors 31 and 29. The blocking action of device 26 is accomplished by the flow of control electrode current through capacitors 28′ and 30 during the positive portion of a single cycle of oscillation. Inasmuch as the control electrode 25 is periodically biased beyond the anode current cut-off point by the pulses of control electrode current flowing through capacitors 28′ and 30, the average potential of control electrode 25 is substantially negative and the negative potential may be conveniently used as a source of biasing potential for other electron discharge devices of the circuit, as will be described in more detail hereinafter.

The anode current of device 26 is in the form of a series of periodic pulses, the recurrence interval of these pulses being determined primarily by capacitors 28′ and 30 and resistors 29 and 31. The free-running frequency of the oscillator may be conveniently adjusted by varying either of the resistors 29 or 31.

In order to generate a sawtooth sweep voltage for scanning the cathode ray viewing screen, there is provided a capacitor 36 which is charged from potential source 23 through resistor 37. Pulses of anode current of device 26 operate periodically to discharge capacitor 36 so as to produce a saw-tooth wave of voltage thereacross. The saw-tooth wave of voltage produced across capacitor 36 is coupled to the input circuit of horizontal amplifier circuit 10 by means of a capacitor 39 wherein it is amplified and transformed in the output circuit of amplifier 10 into a sawtooth wave of current which flows through electro-magnetic coils 11.

In order to obtain an electrical wave which is dependent in energy content upon the phase relationship of scanning oscillator 26 and the incoming synchronizing pulses from the synchronizing signal separator 8, I provide means for combining the oscillator output waveform and the incoming synchronizing pulses. More particularly, the oscillator output waveform and the synchronizing pulses are applied to the control electrode of mixer device 15 wherein they are compared so as to derive the above-described electrical wave. Mixer device 15 operates as a phase detector from which is usually derived a unidirectional control voltage. However, in accordance with my invention only the alternating current components of the derived wave are utilized as will be described more fully hereinafter. The control electrode 14 of mixer device 15 is connected through resistor 24 to the control electrode 25 of the oscillator as has been previously described. Due to the fact that the control electrode 25 is operated at a substantial negative bias voltage, the negative voltage produced at electrode 25 is divided between resistors 24 and 21 and the voltage across resistor 21 is applied to electrode 14. The bias voltage applied to electrode 14 by selection of appropriate values of resistors 24, 21, is preferably made sufficient to operate device 15 beyond the anode current cut-off point so that anode current does not normally flow in device 15. However, upon occurrence of the positive synchronizing pulses which are connected to control electrode 14 through the coupling capacitor 13, and also during the occurrence of the oscillator output waveform, which is coupled to control electrode 14 through capacitor 34 and resistor 35, device 15 is driven sufficiently positive so as to cause the flow of anode current therein.

The anode current pulses which are produced by the combined action of the synchronizing pulses and the oscillator output waveform flow through resistor 17 and causes a corresponding voltage drop thereacross. There is thus produced in the cathode circuit of mixer device 15, a periodically recurring waveform the energy content of which varies with changes in the relative phase relation of the synchronizing pulses and the oscillator output waveform.

Also, in accordance with my invention, I provide a thermal integration means for controlling the frequency of oscillation generator 26 in accordance with the phase responsive wave which is produced across the cathode resistor 17, said thermal integration means having a thermal time constant sufficiently small to follow gradual changes in the average frequency of the synchronizing pulses. More particularly, an electron discharge device 20, preferably of the directly heated cathode type is utilized. The alternating current components of the phase responsive wave form produced across resistor 17 are coupled through capacitor 18 to the cathode 19 of device 20 so as to produce heating of the cathode thereby. The alternating current components of the phase responsive wave flow through the directly heated cathode 19 and cause proportional heating thereof and hence a certain electron emission therefrom. The efficiency of device 20 and, correspondingly, the anode-cathode space path resistance thereof, varies in accordance with the heating of cathode 19 according to the well known temperature limited emission characteristic of such devices. Therefore, as the phase relationship between the synchronizing pulses and the oscillator output waveform changes, the character of the phase responsive waveform produced across resistor 17 undergoes a corresponding change with a consequent change in the energy content thereof. Changes in the energy content of the wave supplied to cathode 19 cause corresponding changes in the efficiency of the diode 20 and cause changes in the effective resistance of the shunt combination of the resistor 31 and diode 20. While I have indicated diode 20 as preferably being of the directly heated cathode type, an indirectly heated cathode may readily be employed in the event that a larger thermal time-constant is desired.

In considering the action of the control diode 20 upon the frequency of oscillation generator 26 let us assume first that the blocking oscillator is running at a slightly higher frequency than the synchronizing pulses. Under such conditions the oscillator feedback waveform is leading the synchronizing pulse waveform and the derived waveform produced across resistor 17 is of decreased energy content. The decreased energy content of the derived waveform is effective to supply less energy to the cathode of diode 20 thereby decreasing the anode-cathode space path resistance thereof and causing less shunting of resistor 31 by the diode. This in turn decreases the frequency of the oscillator 26 by increasing the control electrode time constant thereof thus giving the desired regulation for synchronization.

If, on the other hand, the blocking oscillator 26 is running at a frequency lower than the synchronizing pulses, the oscillator waveform will occur later in time, thus producing a composite waveform across resistor 17 which is of substantially greater energy content. The increased energy content of the composite waveform applied to the cathode 19 results in an increased efficiency of the diode 19 and a corresponding decrease in the anode-cathode space path resistance thereof, which in turn increases the shunting effect of diode 20 and effectively decreases the time constant 30, 31.

In the synchronizing system of Fig. 1 the control range afforded by the shunt combination of diode 20 and resistor 31 has an upper limit of resistance, the value of resistor 31, which upper limit is reached when diode 20 is in a non-conductive state. In the event that a greater control range is required the control network 20, 31 may be replaced by the variable resistance network shown in Fig. 2. The modified form of my invention represented in Fig. 2 differs from that of Fig. 1 only in the particular variable resistance network involved. Corresponding elements have been designated by the same reference numerals and the function of these elements is essentially the same, therefore, they need not be repeated herein. In the modification of Fig. 2 an electron discharge device 41 is additionally employed, the cathode 40 of device 41 being connected to the junction point of the capacitor 30 and the anode 32 of directly heated diode 20. The anode 42 of device 41 is connected through control resistor 31 to ground. The cathode 40 of device 41 may be heated by any suitable means such as a filament 43 which may be connected to a conventional filament transformer which is not shown in the drawing. However, it will be apparent from the following discussion that a directly heated diode 41 may equally well be employed.

During the positive half cycles of the oscillations produced at the control electrode 25 of the oscillator 26, and correspondingly during the periods when capacitors 28′ and 30 are being charged, the diode 41 is so connected as to be held in a non-conductive state. Therefore, the alternating current resistance of the network of Fig. 2 comprising diodes 20, 41 and resistor 31, as viewed from the capacitor 30, approaches infinity when the diode 20 is in a non-conducting state. The effective resistance of the network decreases with increasing efficiency of diode 20, the value of this effective resistance depending upon resistance 31 and the phase responsive derived waveform which is produced across the cathode resistor 17.

The thermal time constant of the directly heated cathode 19 of device 20 is preferably made sufficiently high so that no short time information, such as noise impulses and the like, produce variations in the anode-cathode space path resistance of device 20. On the other hand, the thermal time constant of the cathode of device 20 is preferably made sufficiently low that the gradual changes in the synchronizing frequency, which appear as changes in the character of the waveform produced across resistor 17, are reflected in corresponding changes in the anode-cathode space path resistance of device 20 and thereby produce changes in the operating frequency of oscillation generator 26.

While I have shown the control device 20 as being energized from the cathode circuit of mixer device 15, which arrangement provides a convenient and very satisfactory impedance matching circuit suitable for use with the relatively low impedance of the directly heated cathode of device 20, it will be understood that various other arrangements may equally well be employed to supply the phase responsive waveform produced in mixer device 15 to the cathode of control device 20. Also, it will be apparent to those skilled in the art that other mixing circuits may be utilized to combine the synchronizing pulses and the oscillator output wave so as to provide a wave responsive control waveform which may be supplied to the cathode of control device 20.

From the foregoing, it is evident that the present invention makes it possible to provide a heat energy storage device having a thermal time constant of sufficiently low value adequately to follow the gradual changes which may occur in the average frequency of a television synchronizing signal. Also in accordance with the invention, an electron discharge device operates both as a heat storage element and as a frequency controlling element of the oscillator. By the use of such a heat storage element, it is possible to utilize a synchronizing signal consisting of synchronizing pulses which are interspersed with spurious and undesired pulses of substantial amplitude and still obtain essentially noise-free synchronization of the oscillator by virtue of the integration obtained in the heat energy storage process.

While the invention has been described by reference to particular embodiments thereof, it will be understood that numerous modifications may be made by those skilled in the art without departing from the invention. I, therefore, aim in the appended claims to cover all such equivalent variations as come within the true spirit and scope of my invention.

What I claim as new and desire to secure by Letters Patent of the United States is:

1. In an oscillator synchronizing system, the combination of a source of synchronizing signals which may be contaminated by spurious and undesired impulses, an oscillation generator arranged to provide an output wave of substantially the same frequency as said synchronizing signals in the absence of frequency-corrective energy applied thereto, means for synchronizing said oscillation generator with said synchronizing pulses while substantially eliminating the deleterious effects of said spurious and undesired impulses comprising, means for deriving a periodic wave dependent in energy content upon the relative phase relation of said synchronizing pulses and said output wave, an electron discharge device having at least an anode and a cathode, means for energizing said cathode by said derived wave thereby to vary the efficiency of said device in accordance with said derived wave, and means for varying the frequency of said oscillation generator in accordance with variations in the efficiency of said device, thereby substantially to maintain said oscillation generator in phase with said synchronizing pulses.

2. An oscillator synchronizing system comprising, a source of synchronizing signals, an oscillation generator arranged to provide an output wave of substantially the same frequency as said synchronizing signals in the absence of frequency-corrective energy applied thereto, means for combining said output wave and said synchronizing pulses to derive a periodic wave dependent in energy content on the relative phase relation of said synchronizing pulses and said output wave, and means for controlling the frequency of said oscillation generator in accordance with said derived wave, said last named means comprising a first electron discharge device having at least an anode and a cathode, a second electron discharge device having at least an anode and a cathode, and a resistor, said second device and said resistor being connected in series across said first device, and means for energizing the cathode of said first device by said derived wave.

thereby substantially to maintain said oscillation generator in phase with said synchronizing pulses.

3. An oscillator synchronizing system comprising a source of synchronizing pulses which may be contaminated by spurious and undesired impulses, an oscillation generator arranged to provide an output wave and having a frequency determining resistive element associated therewith, means for combining said output wave and said synchronizing pulses to derive a wave dependent in energy content on the relative phase relation of said synchronizing pulses and said output wave, means for integrating said derived wave and for changing the frequency of said oscillator in accordance with changes in the energy content of said derived wave comprising, an electron discharge device having at least an anode and a directly heated cathode, and means for energizing said cathode from said derived wave.

4. An oscillator synchronizing system comprising, a source of synchronizing pulses which may be contaminated by spurious and undesired impulses, an oscillation generator arranged to provide an output wave, means for combining said output wave and said synchronizing pulses to derive a wave dependent in energy content on the relative phase relation of said synchronizing pulses and said output wave, an electron discharge device having at least an anode and a cathode, means for energizing said cathode in accordance with said derived wave, and means for utilizing the anode-cathode space path resistance of said device to effect control of the frequency of said oscillation generator, thereby substantially to maintain said oscillation generator in phase with said synchronizing pulses.

5. An oscillator synchronizing system comprising, a source of synchronizing pulses which may be contaminated by spurious and undesired impulses, an oscillation generator arranged to provide an output wave and having a frequency determining resistive element associated therewith, means for combining said output wave and said synchronizing pulses to derive a wave dependent in energy content on the relative phase relation of said synchronizing pulses and said output wave, and means for varying the frequency of said oscillation generator in accordance with variations in the energy content of said derived wave, said last named means comprising an electron discharge device connected across said resistive element and having at least an anode and a cathode, and means for energizing said cathode by said derived wave, thereby substantially to maintain said oscillation generator in phase with said synchronizing pulses.

6. An oscillator synchronizing system comprising a source of synchronizing pulses which may be contaminated by spurious and undesired impulses, an oscillation generator arranged to provide an output wave and having a frequency determining resistive element associated therewith, means for combining said output wave and said synchronizing pulses to derive a wave dependent in energy content on the relative phase relation of said synchronizing pulses and said output wave, and means for varying the frequency of said oscillation generator in accordance with variations in said derived wave, said last named means comprising an electron discharge device connected across said resistive element and having at least an anode and a directly heated cathode, and means for heating said cathode proportional to said derived wave, thereby substantially to maintain said oscillation generator in phase with said synchronizing pulses.

7. An oscillator synchronizing system comprising, a source of synchronizing pulses which may be contaminated by spurious and undesired impulses, an oscillation generator arranged to provide an output wave, means for combining said output wave and said synchronizing pulses to derive a periodic wave dependent in energy content upon the relative phase relation of said synchronizing pulses and said output wave, and a frequency determining network for said oscillator, said frequency determining network comprising a first electron discharge device having at least an anode and a directly heated cathode, a second electron discharge device having at least an anode and a cathode, said second device and said resistor being connected in series across said first device, and means for heating the cathode of said first device proportional to said derived wave, thereby substantially to maintain said oscillation generator in phase with said synchronizing pulses.

WOLF J. GRUEN.

REFERENCES CITED

The following references are of record in the file of this patent:

UNITED STATES PATENTS

| Number | Name | Date |
|---|---|---|
| 2,052,184 | Lewis | Aug. 25, 1936 |